March 30, 1943.  H. NYQUIST  2,315,450
METHOD OF AND APPARATUS FOR LOCATING TRANSMISSION FAULTS
Filed June 14, 1941
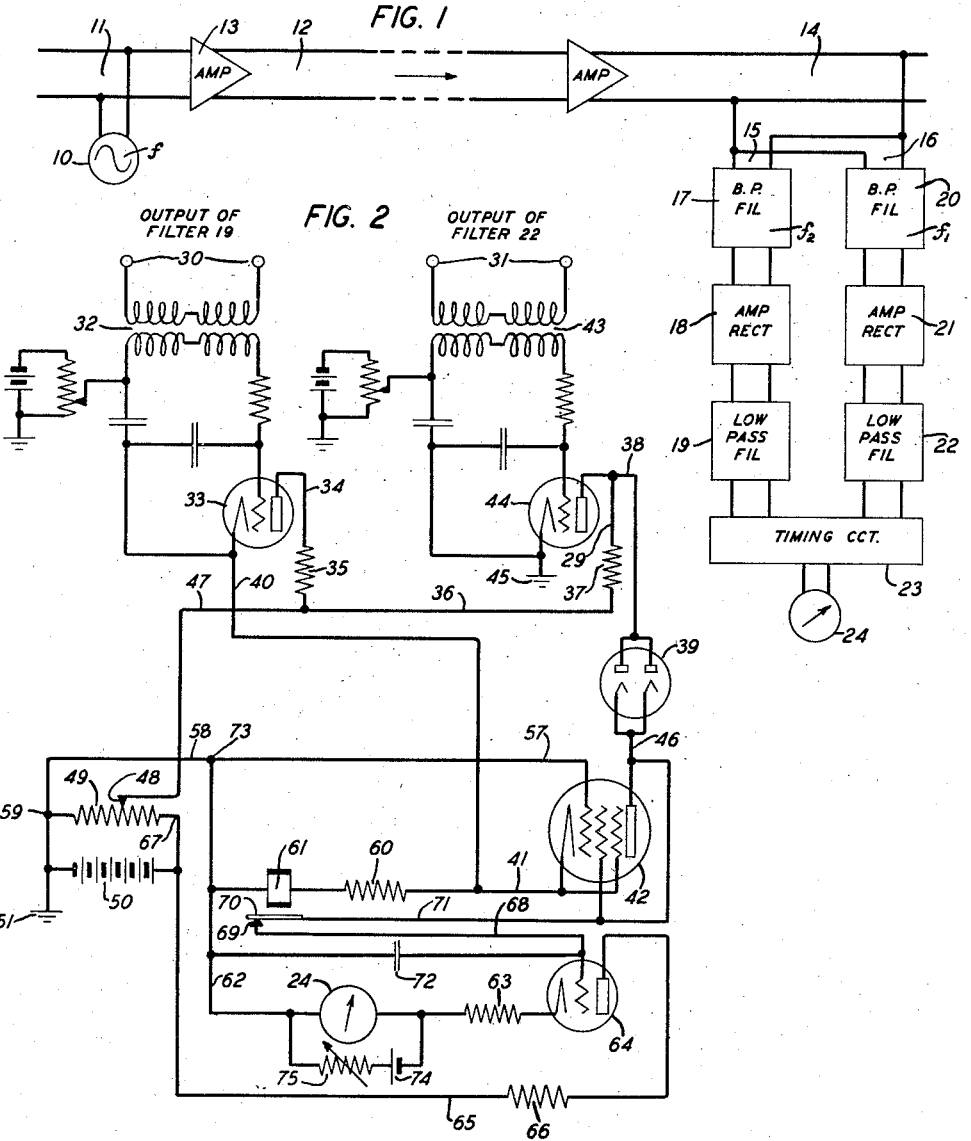
INVENTOR
H. NYQUIST
BY H. A. Burgess
ATTORNEY Patented Mar. 30, 1943

2,315,450

UNITED STATES PATENT OFFICE 2,315,450

METHOD OF AND APPARATUS FOR LOCATING TRANSMISSION FAULTS

Harry Nyquist, Millburn, N. J., assignor to Bell Telephone Laboratories, Incorporated, New York, N. Y., a corporation of New York Application June 14, 1941, Serial No. 398,115

15 Claims. (Cl. 175—183)

This invention relates to a method of and apparatus for measurement of time delay between two alternating current waves, and more particularly to such measurement of time delay for determining the location of faults on signaling transmission lines.

Heretofore, an arrangement involving measurement of phase shift of alternating current waves has been utilized to ascertain the location of faults on signaling transmission lines. This arrangement has been expeditiously utilized in the factory during the manufacture of individual lengths of transmission cable and in the field on sections of transmission lines on an intermittent basis. Obviously, such arrangement is unsuited for either indicating or locating faults of a transient nature. Another technique for locating faults in long transmission lines has been to embody a fault indicator in each section thereof and then to assign a workman to each such indicator so that when a fault occurs on the line the occurrence of the latter may be promptly telephoned by the workman to a supervisory station. This merely enables identification of a particular section on which a fault occurred without regard to the definite location of the transient on the particular section. Such technique is unsatisfactory for the reason that (1) the fault is not definitely located, and (2) it is too expensive from the standpoint of personnel required.

The present invention contemplates apparatus which indicates the occurrence of faults of such nature that signaling transmission on a line is interrupted and at the same time which provides indications that may be utilized for expeditiously locating the faults.

The main object of the invention is to locate faults on a transmission line.

Another object is to record the occurrence of faults on a transmission line.

A further object is to provide facile apparatus which indicates the occurrence of a fault such that the location thereof may be readily ascertained from the indication.

A still further object is to record at unattended points the occurrence of faults on a transmission line.

Still another object is to record at unattended points of a transmission line the occurrence of transient faults such that the individual records may thereafter be used to determine the location of the faults associated therewith.

In a specific embodiment, the invention comprises a transmission line to a near point of which is continuously applied an alternating current wave of frequency $f$, and to a far point of which are connected two circuits each of which is arranged to select a wave of individual frequency $f_1$ or $f_2$. To these frequency selective circuits is connected a timing circuit comprising essentially a pair of gaseous discharge tubes, a capacitor and an indicator thereacross for recording the delay between the waves $f_1$ and $f'$ at the far point of the line.

When a condition of no-fault exists on the transmission line, the wave $f$ is transmitted continuously thereover and the capacitor is charged to a predetermined amount to produce a maximum reading on the indicator. However, when a fault occurs at an unknown point to interrupt abruptly transmission on the line, there is produced a transient comprising waves whose frequencies are above and below the frequency $f$ of the wave being continuously transmitted on the line. Assuming such transient includes two waves having frequencies $f_1$ and $f_2$ lying respectively equidistantly above and below the frequency $f$, these waves will be transmitted to the far point of the line at which point they will arrive in a time order, depending on their individual rates of propagation.

Assuming the wave $f_1$ to have the higher rate of propagation, then it will arrive first at the far point of the line and is immediately selected by one frequency selective circuit and caused to institute ionization in a first gaseous tube whereby discharge of the capacitor is commenced. The arrival of the wave $f_2$ at the far point of the line sometime later serves to institute ionization in the second gaseous tube thereby terminating the discharging of the capacitor. The reading on the indicator shows the magnitude of the charge then remaining on the capacitor. The difference between the initial maximum reading and the second reading is utilized to represent the time difference between the arrival of the two waves $f_1$ and $f_2$ at the far point of the line. This time difference is employed to ascertain the distance back from the far point to the unknown point on the line at which the fault occurred.

The invention will be readily understood from the following description taken together with the accompanying drawing in which:

Fig. 1 is a schematic circuit illustrating a specific embodiment of the invention;

Fig. 2 is a schematic circuit showing the timing device, and

Fig. 3 is a curve representing the delay characteristic of waves of different frequencies on a transmission line.

Referring to Fig. 1 a source 10 of an alternating current wave of frequency f is applied across sending point 11 of a line 12 transmitting signaling energy in the direction indicated by the arrow and embodying one or more amplifiers 13 of a suitable type.

Across the receiving point 14 of the line 12 are connected a first frequency selective circuit 15 having in sequence a band-pass filter 17, an amplifier-rectifier 18 and a low-pass filter 19, and a second frequency selective circuit 16 including in sequence a band-pass filter 20, an amplifier-rectifier 21 and a low-pass filter 22. The outputs of both low-pass filters 19 and 22 are impressed on the input of a timing circuit 23 whose output is supplied to an indicator 24 and whose function will be hereinafter explained.

The timing circuit 23 is shown in detail in Fig. 2 in which the output of the filter 19 is to be applied across the terminals 30, 30 while the output of the filter 22 is to be impressed across the terminals 31, 31. The output of the timing circuit of Fig. 2 embodies the indicator 24 which is also illustrated in Fig. 1. The terminals 30, 30 are applied through a transformer 32 across the input of gaseous discharge tube 33 whose anode is connected over lead 34, resistor 35, lead 36, resistor 37, lead 29, lead 38 to the joined anodes of diode rectifier tube 39. The cathode of the gaseous tube 33 is joined by leads 40 and 41 to the cathode of pentode control tube 42.

The terminals 31, 31 are applied through transformer 43 to the input of a gaseous discharge tube 44 whose anode is extended over the lead 38 to the joined anodes of the rectifier tube 39 and whose cathode is applied to ground 45. The joined cathodes of the rectifier tube 39 are connected by a lead 46 to the anode of the pentode tube 42. The joined anodes of the rectifier tube 39 extend over leads 38 and 29, resistor 37, lead 36, lead 47 to a variable tap 48 on a resistor 49 applied across source 50 of direct current voltage whose negative terminal is applied to a ground 51.

The control grid of the pentode tube 42 is connected by lead 57, terminal 73 and lead 58 to a terminal 59 of the resistor 49. The cathode of the pentode tube 42 extends over lead 41, resistor 60, winding of a relay 61, lead 62, indicator 24, resistor 63 to the cathode of triode tube 64 whose anode is connected by lead 65 embodying resistor 66 to terminal 67 of the resistor 49. The lead 62 extends to a terminal 73 which is common to the leads 58 and 57. The control grid of the triode tube 64 is joined by lead 68, contact 69 and armature 70 of relay 61, lead 71 to the anode of the pentode tube 42. A capacitor 72 applied between the leads 62 and 68 is effectively connected in the output of pentode tube 42, and has the indicator 24 effectively connected thereacross.

In the absence of voltages across the terminals 30, 30 or 31, 31, the gaseous tubes 33 and 44 are both deionized due to the negative biasing voltages on their control grids and a constant voltage is impressed on the joined anodes of the rectifier 39 over a circuit comprising contact 48 on resistor 49, leads 47 and 36, resistor 37 and leads 29 and 38. This voltage effects conductivity in the rectifier tube 39 in a circuit extending through pentode tube 42 and comprising the joined cathodes of the rectifier 39, lead 46, anode-cathode of the pentode tube 42, lead 41, resistor 60, winding of the relay 61, lead 62, common terminal 73, lead 58, terminal 59 and resistor 49. Serially connected capacitor 72, lead 68, contact 69 and armature 70 of the relay 61, lead 71 extend between the lead 62 and the anode of the pentode tube 42.

The magnitude of the voltage charge placed on the capacitor 72 is equal to the voltage across the serially connected pentode tube 42, resistor 60, and winding of relay 61 as the capacitor 72 is in parallel therewith as will be readily seen from Fig. 2. The triode tube 64 which is also in parallel with the pentode tube 42 and capacitor 72 serves to control the voltage measurements across the latter. In this connection, it is to be understood that under a condition of no voltage on the terminals 30, 30 and 31, 31, the normal space current of the pentode tube 42 is insufficient to operate the relay 61. Hence, the contact 69 remains in a closed condition.

The voltage across the capacitor 72 is measured on the indicator 24 embodied in the anode-cathode circuit of the triode tube 64. As the triode tube 64 is operated at a substantially zero biasing voltage on its control grid and on a straight line portion of its plate current-grid voltage characteristic, the amount of space current flowing therein, under a condition of no voltage compressed on the terminals 30, 30 and 31, 31, would be in excess of the range of the indicator 24. Hence the reading on the indicator 24 would be off scale.

To compensate for such excess amount of space current a source 74 of direct current in series with a variable resistor 75 applied in shunt of the indicator 24 serves to apply a current opposing the flow of space current in the triode tube 64. Accordingly, the resistor 75 may be adjusted to provide the indicator 24 with an initial maximum reading to represent a predetermined magnitude of charge on the capacitor 72. It is apparent that the space current circuit of the triode tube 64 extends over the anode-cathode, resistor 63, indicator 24, lead 62, common terminal 73, lead 58, source 50, lead 65 embodying resistor 66 to the anode.

The condition of no voltage applied to the terminals 30, 30 and 31, 31 is the same as a condition on the line 12 under which signaling energy is being transmitted in the absence of interruptions occasioned by the occurrence of faults having either a permanent or a transient nature. Hence, it may be assumed that for the purpose of the following explanation of the operation of Figs. 1, 2 and 3 that the indicator 24 shows a maximum reading for a predetermined magnitude of charge on the capacitor 72 for a non-fault condition of signaling transmission on the line 12.

In the operation of Figs. 1 and 2, the wave f is being continuously applied to the near point 11 of the line 12 for transmission thereof, while at the far point 14 this wave is being continuously rejected by the filters 17 and 20 which are individually designed to pass two alternating current waves having other frequencies which will be subsequently specified. As the waves of such frequencies are not being transmitted on the line 12, no action is effected in the frequency selective circuits 15 and 16, and consequently the indicator 24 continues to produce the maximum reading, which was above mentioned.

Now, let it be assumed that a fault occurs at an unknown point intermediate the respective far and near points 11 and 14 on the line 12 to interrupt abruptly signaling transmission thereon. It is known that such interruption of the wave f produces a transient, which Fourier analysis will show, comprises a spectrum of frequencies of varying amplitudes above and below the frequency of the wave $f$. This spectrum contains two components $f_1$ and $f_2$ both of which are transmitted along the line 12 in the direction indicated by the arrow.

At the far point 14, the band-pass filters 17 and 20 are designed to select a portion of the energy of the respective two components $f_1$ and $f_2$ such that therefrom the individual waves selected with maximum energy, for a purpose that will be presently explained, have the frequencies $f_1$ and $f_2$. The latter are also assumed to represent substantially the mid-frequency of the previously correspondingly identified components. In addition, $f_1$ and $f_2$ are assumed to indicate waves of individual frequencies chosen as lying respectively equidistantly above and below the frequency $f$ and half-way between the pass-bands of the respective filters 17 and 20. In other words, the filters 17 and 20 select individual waves having the respective frequencies $f_1$ and $f_2$ so that a maximum time delay will exist therebetween with respect to the time delay as between any other two waves also embodied in the transient and having frequencies lying equidistantly above and below the transmitted frequency $f$.

The waves $f_1$ and $f_2$ will arrive successively at the far point 14 in a time order depending on their individual rates of propagation: Assume for the purpose of this explanation that wave $f_1$ possesses the higher rate of propagation relative to the wave $f_2$ and is therefore the first of these two waves to arrive at the far point 14. The wave $f_1$ is selected by the filter 20, amplified and rectified on amplifier-rectifier 21, and applied through the low-pass filter 22 to the terminals 31, 31 of the timing circuit 23. The low-pass filter 22 serves to remove extraneous waves of extraneous frequencies present usually after rectification so that the transient wave $f_1$ applied to the terminals 31, 31 contains low frequencies representing the envelope of the transient wave $f_1$.

This pulse renders the normal biasing voltage on the control grid of the gaseous tube 44 less negative by an amount which is adequate to institute ionization therein. Ionization of the gaseous tube 44 lowers the anode voltage applied to the rectifier 39 by the amount of the voltage drop across the tube 44 which drop is approximately 15 volts. This is for the reason that the previously traced voltage circuit for the anodes of the rectifier tube 39 is divided such that a portion is now effective through the ionized gaseous tube 44 to the ground 45. The potential of the cathodes of rectifier tube 39 will be higher than that of the anodes associated therewith. Hence, the conductivity of rectifier 39 is terminated. The capacitor 72 will now commence to discharge through the pentode tube 42 at a constant rate, as the space current of the latter is constant for variations of anode voltage, in a circuit comprising right terminal of the capacitor 72, lead 68, contact 69 and armature 70 of the relay 61, lead 71, anode-cathode of the pentode tube 42, lead 41, resistor 60, winding of relay 61, lead 62 and back to the left terminal of the capacitor 72.

The wave $f_2$ having the slower rate of propagation relative to the wave $f_1$ will arrive sometime later at the far point 14, and is selected by the filter 17 amplified and rectified in the amplifier-rectifier 18, and applied through the low-pass filter 19 to the terminals 30, 30 of the timing circuit 23. The low-pass filter 19 functions similarly to the low-pass filter 22 in the manner hereinbefore specified. Thus, the transient wave $f_2$ impressed on the terminals 30, 30 contains low frequencies representing the envelope of the transient wave $f_2$.

This pulse renders the normal biasing voltage on the control grid of the gaseous tube 33 less negative by an amount which is adequate to commence ionization therein. Ionization of the gaseous tube 33 causes a flow of space current in a circuit comprising anode-cathode of gaseous tube 33, lead 40, resistor 60, winding of relay 61, lead 62, common terminal 73, lead 58, terminal 59, a portion of resistance 49, adjustable contact 48, lead 47, resistor 35, lead 34 and the anode of gaseous tube 33. This flow of current increases across the resistor 60 the biasing voltage applied effectively to the cathode of the pentode tube 42, which biasing voltage tends to render the bias on the cathode more positive with respect to its associated control grid.

In effect, such biasing voltage increase on the cathode tends to make more negative the bias on the control grid of the pentode tube 42. This increased negative biasing voltage tends to increase the resistance of the anode circuit of the pentode tube 42 to an amount which terminates the previously mentioned discharging therethrough of the capacitor 72.

As the anode resistance of both the rectifier tube 39 and pentode tube 42 is finite, small amounts of leakage may cause an error before the indicator 24 has come to a state of rest to measure the magnitude of the charge remaining on the capacitor 72. To preclude such error, the space current of the ionized gaseous tube 33 flowing in the circuit above traced including the winding of the relay 61 causes the latter to operate thereby effectively disconnecting the rectifier tube 39 and the pentode tube 42 from capacitor 72. Hence, the magnitude of the charge remaining on the capacitor 72 at the time of the termination of discharge is held at a substantially constant amount for an interval of time depending on the leakage resistance of the capacitor 72 and the shunt resistance of resistor 66.

The difference between the present reading of the indicator 24 and the initial maximum reading indicates the change in the magnitude of the charge on the capacitor 72, that is, the change of the effective voltage thereacross. This difference may be translated into terms of the time difference between the rectified voltage pulses due to the respective waves $f_1$ and $f_2$ and instituting ionization in the gaseous tubes 44 and 33, whereby the commencement and termination of discharge of the capacitor 72 is effected as above specified. This difference also represents the delay between the waves $f_1$ and $f_2$ on the transmission line 12 between the unknown point and the far point 14.

The delay between the waves $f_1$ and $f_2$ may be utilized to locate the distance back from the far point 14 to the unknown point at which the fault occurred, in the following manner:

It is known that the rate of propagation of alternating current waves over a transmission line involves their individual velocities, as well as other characteristics; and that the velocity of individual alternating current waves depends on the equalization of the transmission line for various frequencies. For the purpose of this description, the characteristic of most urgent importance is velocity which will be presently discussed. Delay characteristics of two different transmission lines found useful for an application of this invention are illustrated in Fig. 3.

Referring to Fig. 3, it is seen that the wave $f_1$ has a higher rate of propagation than the wave $f_2$. Thus, assuming the waves $f_1$ and $f_2$ were applied to a near point of a line having length L; the time difference or delay between the arrivals of these two waves at a far point is $$y - x = t \quad (1)$$

where $x$ is the time of arrival of wave $f_1$, $y$ is the time of arrival of wave $f_2$, and $t$ is the time difference therebetween.

As the waves $f_1$ and $f_2$ are not applied to the near end of the line L but produced at the unknown point lying somewhere between near and far points, the wave $f_1$ having the higher rate of propagation will be the first wave to arrive at the far point of the line L, and of course the wave $f_2$ will arrive sometime later at the same far point. Thus, the time difference between such arrivals is $$y' - x' = t' \quad (2)$$

where $x'$ is the time of arrival of wave $f_1$, $y'$ is the time of arrival of wave $f_2$, and $t'$ is the time difference therebetween.

In this connection it is to be understood that the length of transmission line traveled by the waves $f_1$ and $f_2$ after their production in the transient due to the fault as above mentioned may be represented by L', which length is obviously the same as the distance back from the far point to the unknown point of the fault.

Thus, from Equation 1

$$L \text{ is proportional to } t \quad (3)$$

where L is the over-all length of the transmission line extending between the near and far points to be traversed by waves $f_1$ and $f_2$ if both thereof were applied at the same time to the near point of the line L. From Equation 2

$$L' \text{ is proportional to } t' \quad (4)$$

where L' is the length of the transmission line traversed by waves $f_1$ and $f_2$ subsequent to their production at the unknown point.

Relating Equations 3 and 4

$$\frac{L}{L'} = \frac{t}{t'} \quad (5)$$

or $$L' = \frac{Lt'}{t} \quad (6)$$

where L' is the distance back from the far point to the unknown point at which the fault occurred, L is the over-all length of the transmission line extending between the near and far points to be traveled by the waves $f_1$ and $f_2$ if both thereof were applied at the same time to the near end, $t'$ is the time difference between the arrival of the transient waves $f_1$ and $f_2$ at the far point, and $t$ is the time difference between the arrival of the waves $f_1$ and $f_2$, assuming both thereof to be applied simultaneously to the near point of the line L.

Thus, the location of the unknown point of the above assumed fault may be determined from Equation 6 by substituting therein for $t'$, the time difference between the arrival of the transient waves $f_1$ and $f_2$ at the far point 14; for L, the over-all length of the line 12 over which the waves $f_1$ and $f_2$ would travel if both waves were applied at the same time to the near point 11; and for $t$, the time difference between the arrival of the waves $f_1$ and $f_2$ at the far point 14, assuming a condition of no fault and both these waves were applied at the same time to the near point 11. Obviously, the distance L' serves to locate on the line 12 the distance back from the point 14 to the unknown point at which the assumed unknown fault occurred.

It is to be understood that the indicator 24 may be so calibrated that the delay or time interval between the waves $f_1$ and $f_2$ may be read directly therefrom; that suitable provisions may be embodied in Fig. 2 to restore the gaseous tubes to the deionized condition on an automatic basis; that a suitable recording device may be substituted for the indicator 24; and that Figs. 1 and 2 may be modified for automatic use at attended or unattended points on the transmission line 12.

What is claimed is:

1. The method of locating faults on a transmission line, which comprises utilizing an alternating current wave continuously transmitted on said line to effect transient alternating current waves, including at least two certain waves having different frequencies, in response to a fault interrupting transmission at an unknown point on said line, and utilizing the time delay between the individual arrivals of said two certain waves at another point on said line to ascertain the location of said unknown point with respect to said other point.

2. The method of locating faults on a transmission line, which comprises utilizing an alternating current wave continuously transmitted on said line to effect transient alternating current waves, including at least two certain waves having different frequencies, in response to a fault interrupting transmission at an unknown point on said line, observing the individual arrivals of said two certain waves at another point on said line, and utilizing said observed individual wave arrivals to determine the time difference therebetween for locating the distance between said unknown point and said other point such that said distance is proportional to said time difference.

3. The method of locating faults on a transmission line, which comprises utilizing an alternating current wave continuously transmitted on said line to effect transient alternating current waves, including at least two certain waves having different frequencies, in response to a fault interrupting transmission at an unknown point on said line, observing the time difference between individual arrivals of said two certain waves at another point on said line, and utilizing said time difference to ascertain the distance back from said other point to said unknown point such that said distance is proportional to said time difference.

4. In combination, in apparatus for locating transmission faults, a line subject to a fault causing an interruption of transmission, means to apply an alternating current wave continuously to one point on said line, said wave giving rise to transient alternating current waves including at least two certain alternating current waves having different frequencies after the fault has occurred at an unknown point on said line, and means at another point on said line to observe selectively the arrival thereat of each of said two certain transient waves on a time differential basis.

5. In combination, in apparatus for locating transmission faults, a line subject to a fault causing an interruption of transmission, means to apply an alternating current wave continuously to one end of said line, said wave giving rise to transient alternating current waves including at least two certain alternating current waves having different frequencies after the fault has occurred at an unknown point on said line, and means at an opposite end of said line to observe the time delay between the individual arrivals of said two certain waves thereat, the distance extending between said unknown point and said opposite end being proportional to said time delay.

6. In combination, in apparatus for locating transmission faults, a line subject to a fault causing an interruption of transmission, means to apply an alternating current wave continuously to one point on said line, said wave giving rise to transient alternating current waves including at least two certain alternating current waves of different frequencies after said fault has occurred at an unknown point on said line, means at another point on said line to selectively receive said two certain waves, means to record effectively the arrival of individual certain waves, and means to translate the recorded arrival of individual certain waves into the difference between the travel time of said two certain waves between said unknown and other points, the distance on said line extending between said unknown and other points being proportional to the travel time difference of said two certain waves between said unknown and other points.

7. A system for locating transmission faults, comprising a line subject to a fault interrupting transmission, means to apply an alternating current wave continuously to one point of said line, said wave causing transient alternating current waves including at least two certain waves of different frequencies in response to the fault occurring at an unknown point on said line, and means at another point on said line to indicate the condition of said line with respect to faults, said indicating means being responsive to the individual arrivals of said two certain waves to indicate effectively the time interval therebetween for locating said unknown point relative to said other point.

8. The system according to claim 7 in which a capacitor charged to a predetermined amount indicates a non-fault condition, and said capacitor discharged to some extent indicates both a fault condition and said time interval depending on the extent of the capacitor discharge.

9. A system for locating transmission faults, comprising a line subject to a fault interrupting transmission, means to apply an alternating current wave continuously to one point of said line, said wave causing transient alternating current waves including at least two certain waves of different frequencies in response to the occurrence of the fault at an unknown point on said line, means at another point on said line to record effectively the individual arrivals of said two certain waves thereat, and means actuated by said recording means to translate the effective individual wave arrivals into the time interval between said individual wave arrivals to determine the distance from said unknown point to said other point such that said distance is proportional to said time interval.

10. A system for locating transmission faults, comprising a line subject to a fault interrupting transmission, means to apply an alternating current wave continuously to one point of said line, said wave causing transient alternating current waves including at least two certain waves of different frequencies in response to the occurrence of said fault at an unknown point on said line, and means at another point of said line to observe the condition of said line regarding faults, comprising means comprising a capacitor charged to a predetermined amount to indicate a non-fault condition on said line, and means comprising a pair of gaseous discharge tubes successively ionized by the individual arrivals of said two waves to discharge said capacitor a certain amount to indicate the occurrence of a fault, said certain amount of the discharge of said capacitor also serving to indicate the time difference between said individual wave arrivals for determining the distance between said unknown point and said other point.

11. The method of measuring time difference for locating faults on a long transmission line, comprising continuously applying an alternating current wave of certain frequency to one end of said line, receiving two transient alternating current waves of other different frequencies at another terminal of said line, said transient waves being caused by the fault occurring at an unknown point on said line to interrupt thereat the transmission of said certain wave, selectively translating the individual other waves into individual unidirectional currents, utilizing the individual unidirectional currents to effectively record the time difference between the arrivals of the individual other waves at said other line terminal, and utilizing said time difference to determine the distance on said line extending from said unknown point to said other line terminal such that said distance is proportional to said time difference.

12. A system to ascertain time difference for locating faults on a long transmission line, comprising means to continuously apply an alternating current of certain frequency to one end of said line so that said certain wave gives rise to transient waves including at least two other waves of different frequencies in response to the interruption of transmission of said certain wave at an unknown point on said line, means to selectively receive said two other waves at another terminal of said line, and means responsive to said receiving means to indicate the time difference between the arrivals of the individual other waves; the distance on said line extending between said unknown point and said other line terminal being represented by L' in equation $$L' = \frac{Lt'}{t}$$

where L is the overall length of said line, t' is the difference between the travel time of said two other waves from said unknown point to said other line terminal, and t is the difference between the travel time of said two other waves from said one line terminal to said other line terminal.

13. A system to ascertain time difference for locating faults on a long transmission line, comprising means to continuously apply an alternating current of certain frequency to one end of said line so that said certain wave gives rise to transient waves including at least two other waves of different frequencies in response to the interruption of transmission of said certain wave at an unknown point on said line, means to selectively receive said two other waves at another terminal of said line, means to amplify and rectify the individual other waves, means to indicate the condition of said line with respect to faults, and means responsive to the rectified individual other waves to control said fault-indicating means such that the difference between the travel time of said two other waves from said unknown point to said other line terminal is ascertained, the distance on said line extending from said unknown point to said other line terminal being proportional to said time difference.

14. The fault-locating system according to claim 13 in which said fault-indicating means includes a capacitor charged to a predetermined amount to show that no transient waves are being received at said other line terminal and thereby a non-fault condition on said line.

15. The fault-locating system according to claim 13 in which said fault-indicating means includes a capacitor whose charge is decreased a certain amount with respect to an initial predetermined amount of charge to indicate the difference between the travel time of said two other waves from said unknown point to said other line terminal and thereby a fault condition on said line.

HARRY NYQUIST.